(12) United States Patent
Bräutlgam et al.

(10) Patent No.: US 8,235,592 B2
(45) Date of Patent: Aug. 7, 2012

(54) GAUGE ON A PIPE SECTION

(75) Inventors: Jürgen Bräutlgam, Elsenfeld (DE);
Harald Gollas, Worth am Main (DE);
Joachim Zipp, Collenberg (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 128 days.

(21) Appl. No.: 12/897,080

(22) Filed: Oct. 4, 2010

(65) Prior Publication Data

US 2011/0243186 A1    Oct. 6, 2011

(30) Foreign Application Priority Data

Oct. 7, 2009    (DE) .......................... 10 2009 048 559

(51) Int. Cl.
*G01K 1/14* (2006.01)
*G01K 1/08* (2006.01)
*G01K 13/00* (2006.01)
*G01D 21/00* (2006.01)

(52) U.S. Cl. .................. 374/148; 73/866.5; 73/863.64; 73/863.63; 73/432.1

(58) Field of Classification Search ................... 374/148; 73/866.5, 863.64, 861.63, 861.64, 432.1
See application file for complete search history.

(56) References Cited

U.S. PATENT DOCUMENTS

| | | | |
|---|---|---|---|
| 6,802,217 B2 * | 10/2004 | Dennison | 73/204.11 |
| 7,607,364 B2 * | 10/2009 | Duff | 73/866.5 |
| 7,661,877 B2 * | 2/2010 | Kitahara | 374/138 |
| 7,681,461 B2 * | 3/2010 | Rosenbaum et al. | 73/861.52 |
| 7,861,608 B2 * | 1/2011 | Furey et al. | 73/866.5 |
| 2010/0170483 A1 * | 7/2010 | Wienand et al. | 123/568.12 |
| 2011/0038394 A1 * | 2/2011 | Ma et al. | 374/148 |
| 2011/0252881 A1 * | 10/2011 | Glatzel et al. | 73/204.23 |

FOREIGN PATENT DOCUMENTS

JP    2003240180 A * 8/2003

* cited by examiner

*Primary Examiner* — Lisa Caputo
*Assistant Examiner* — Jamel Williams
(74) *Attorney, Agent, or Firm* — WRB-IP LLP

(57) ABSTRACT

A gauge includes a pipe section with a flattened section in which an opening through a wall of the pipe is provided, an adapter disposed in the opening, the adapter being adapted to receive a measuring probe, wherein the adapter fills the opening and is attached to the pipe section through a material fusion between the adapter and at least one of the pipe wall in the opening and a surface of the flattened section.

12 Claims, 3 Drawing Sheets

GAUGE ON A PIPE SECTION

BACKGROUND AND SUMMARY

Figure 1:
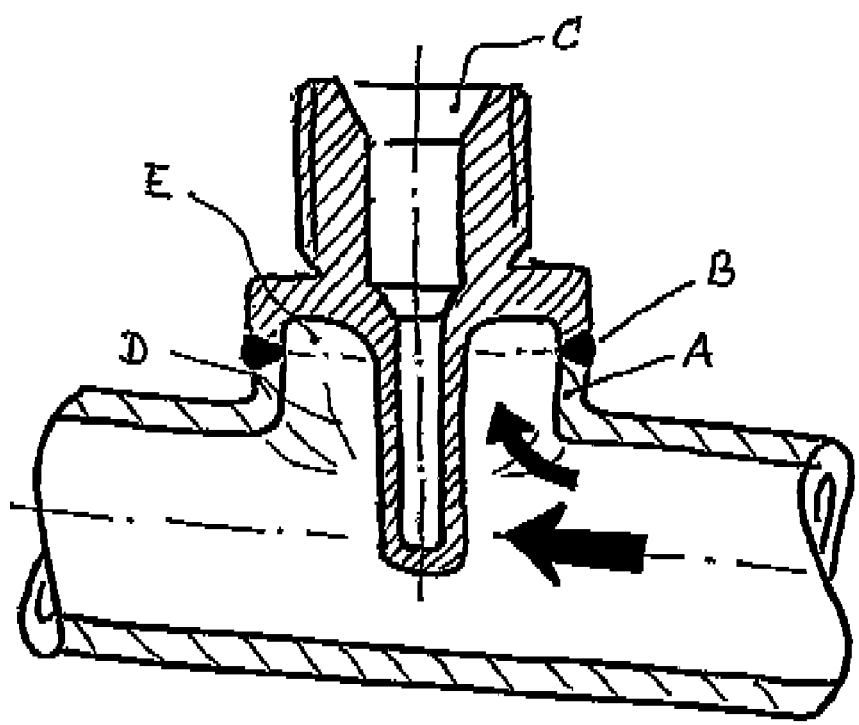

The invention concerns a gauge on a pipe section, such as a temperature gauge, consisting of a pipe section and a welded adapter which can accommodate a probe.

It is the task of the invention to create a cost-effective solution for a gauge on a pipe section without any dead areas. Therefore, a design should be created in which it is possible to change the measuring probe, without opening or interrupting the circuit of the medium to be measured. These tasks are solved with a system as described in the independent claims.

According to the invention, the gauge comprises a flat spot in which an adapter can be introduced through a circular opening.

The adapter as well as the flat spot arc formed so that they are flowed against in a streamlined way. Thanks to the flat spot, a level area is created in which the adapter can be introduced via an automatic welding process, such as the TIG welding procedure. In this procedure, the workpiece is stretched and turned, or alternatively the welding nozzle can turn around the workpiece.

Such processes as "orbital welding attachments," the examination of a welding seam, or the uniform shaping of a welding seam on the far side of the welding nozzle, the inner surface of a wall, are already varied and available and constitute the state of the art with this process, already applied in the pipe work of mass production equipment in the food processing industry and luxury food industry.

In addition to the simplicity of processing the advantageous feature with this arrangement is that no dead room in created, in which the leavings of a medium can accumulate.

With foodstuffs, the smallest clinging remnants in niches or turnoffs suffice to corrupt subsequent processing, due to the by-products that result (germs, bacteria).

By-products develop, for example, during production stoppages, when these accumulating remnants cannot be reached, detached or rinsed out, even by flushing, because the flow doesn't reach these niches. The flow in some areas is "nil," and they are therefore called unreachable dead areas.

Furthermore, the gauge uses a closed adapter which introduces a gauge into the process in the form of a dip pipe or a guard pipe.

The advantage is that during the ongoing process a measuring probe can be removed from the adapter or exchanged without the medium coming out or coming into contact with the outer environment (air, oxygen).

The measuring probe can, for example, consist of a temperature measuring probe with an encapsulated PT 100 precision resistor.

It is furthermore conceivable that other measurement categories, such as flow, pressure or fill level, would be measurable with this adapter.

For temperature measurement, it is sensible to place the probe by means of a guard pipe in the center of the pipe, whereas for pressure measurement in place of the guard pipe a membrane can be introduced into the adapter. If one now fills the adapter with diaphragm seal fluid such as sunflower oil, the pressure of the medium can be transmitted to a pressure measurement device.

Figure 2:
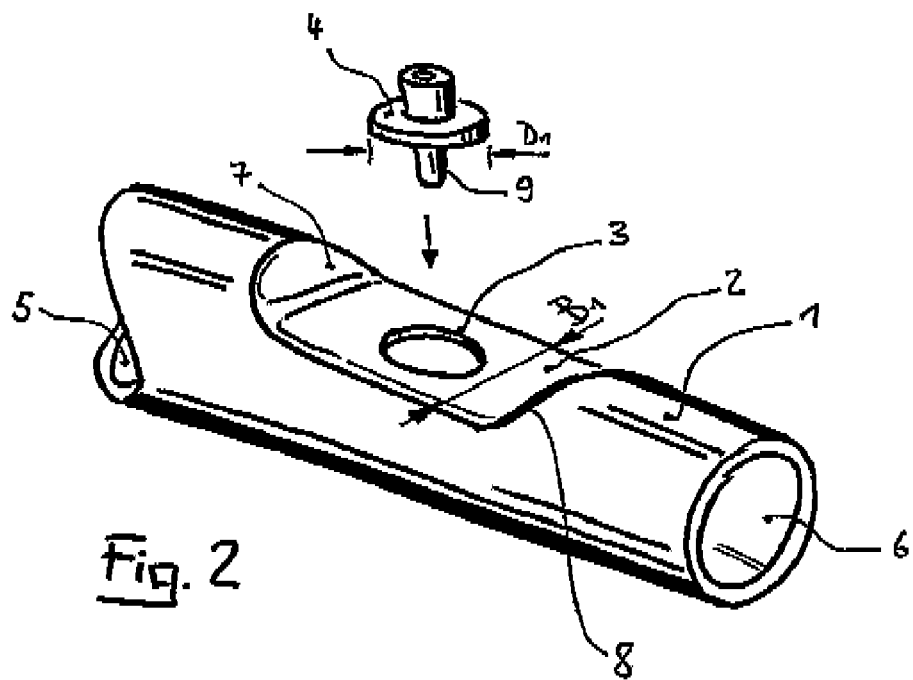
Figure 3:
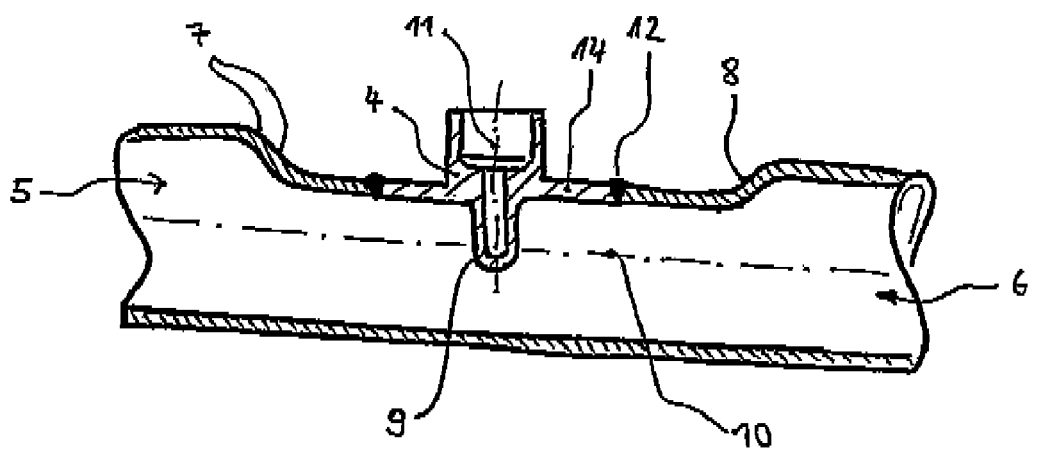
Figure 4:
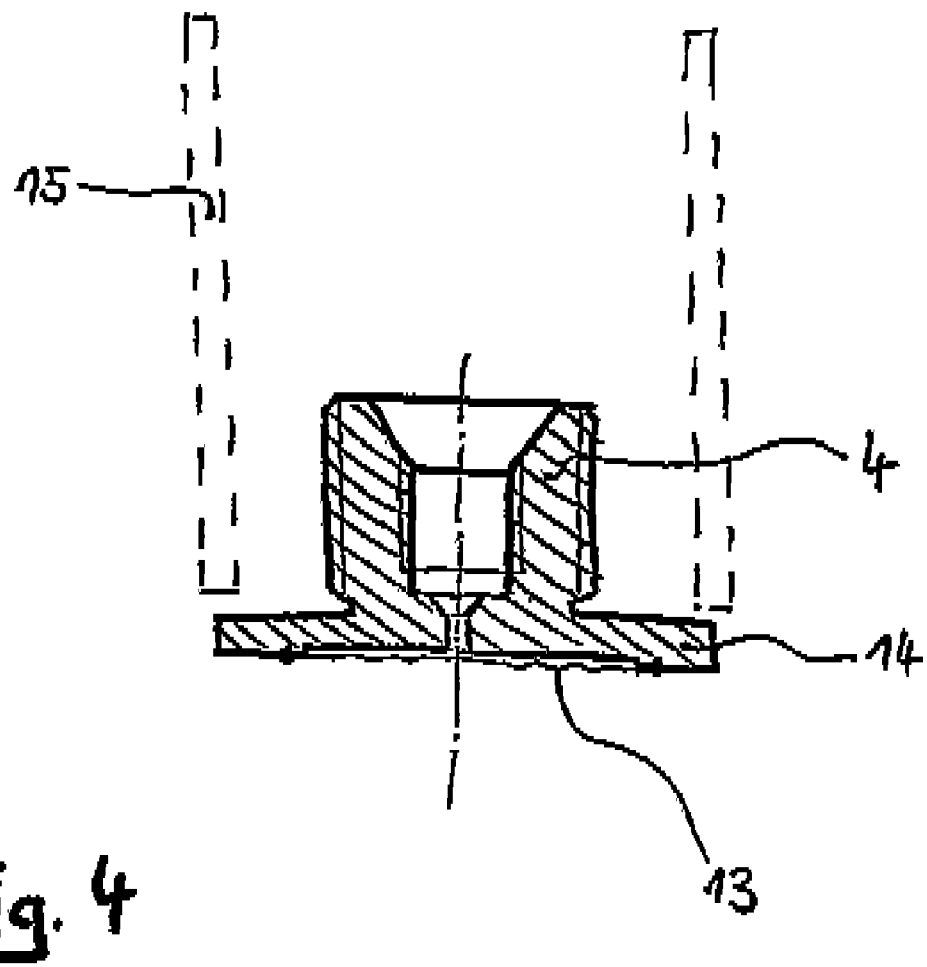

FIG. 1 shows a known modular packaging system;
FIG. 2 is an exploded, perspective view of a gauge on a pipe section according to an aspect of the present invention;
FIG. 3 is a side, cross-sectional view of a gauge on a pipe section according to an aspect of the present invention; and
FIG. 4 is a side, cross-sectional view Of an adapter according to an aspect of the present invention.

DETAILED DESCRIPTION

FIG. 1 shows the state of the art in the form of a modular packaging system such as Type ESP-G, for sale by the company Negele aus Egg an der Günz. In this, a "hose" (A) is formed on the end of a pipe. The hose is flat and flush (B) in order to weld an adapter (C) on.

Forming such hoses is only possible with expensive workpieces and special machines, given that here an internal floating spike must be used. The introduction of the spike as well as the expulsion through the wall is linked to the risk that the different wall thicknesses or forming tools create (D). In particular, a dead area (E) is created.

A medium now flows through a pipe section (large arrow), while parts of this stream flow into the dead area (small arrow). Due to the flow profile it is quite possible, especially with pasty materials or foodstuffs, that parts of the stream will settle and accumulate in the dead area or on bands (D). This is disadvantageous because the remaining remnants can be removed only with heightened effort.

FIG. 2 shows, in three-dimensional representation, a pipe (1) according to the invention which a medium can flow through. The adapter (4) can be introduced into a flattened pipe section (2) via a circular opening (3).

The flattening/planing is introduced from outside in advance via a stamp which is not represented, whereby from the inside, shell molds can be introduced as counter bearings 2 through the openings (5) and (6) beforehand.

These also illustrate the gaps (7) and (8) which are preferably formed by the pressing of the stamp on the pipe wall.

The formation of the flattened area can be done via hydrostatic pressure from the inside or via a workpiece from the inside out. Furthermore, it is possible to flatten the area via a simple pressing of a stamp only from the outside. For orbital welding, the flattening is so proportioned that the breadth (B1) is minimally as large as or larger than the diameter of the adapter (D1).

FIG. 3 shows the gauge in sectional representation. Here, the guard pipe section (9) projects up to the center axis (10) of the pipe or additionally. This ensures an optimal flow and quick response times with regard to the probe, in the event that a temperature probe detects a medium temperature on the low end in the guard pipe.

The adapter is preferably turned or milled so that a cross-section is symmetrically formed in at least one axis (11).

The material bonding, welding (12) can be done via TIG or laser welding, or via another welding method. The laser welding process can also be done from the inside by means of a mirror. The weld contour is, as described above, preferably circular, but can also be a polygon or have multiple angles; NC-controlled welding can produce this contour.

The flattening is preferably achieved by pressing the walls toward the inside, but can also be done from inside toward the outside.

In a further embodiment it is conceivable to attach the adapter from the inside or from the outside through an opening in the flattened pipe section, whereby a layer is formed between the adapter and the pipe wall. The welding takes place then in a layer parallel to the flattened pipe wall or along the contour of the opening.

For logical reasons, a welding contour (14) encompasses the adapter in the thickness of the pipe wall in order to maintain the same wall thicknesses for welding.

FIG. 4 shows the adapter with a front-flush membrane (13) for pressure measurement. The membrane carries the pressure via a diaphragm seal fluid to a pressure measurement device, or the membrane itself works as measurement element, in which, for example, on the other side of the extension measurement element, the pressure is converted directly to a measuring signal analogical to the pressure.

Additionally, a neck pipe (15) which carries the housing of the evaluation unit can be fused in the area of adapter sealing (12, 14), which reduces stress on the adapter.

The invention is not limited to the foregoing exemplary embodiments. They can be modified within the framework of the following claims.

The invention claimed is:

1. A gauge, comprising:
    a pipe section with a flattened section in which an opening through a wall of the pipe is provided,
    an adapter disposed in the opening, the adapter being adapted to receive a measuring probe,
    wherein the adapter fills the opening and is attached to the pipe section through a material fusion between the adapter and at least one of the pipe wall in the opening and a surface of the flattened section.

2. A gauge according to claim 1, wherein the opening is circular.

3. A gauge according to claim 1, wherein at least one dimension of the flattened section is at least as large as a diameter of the adapter.

4. A gauge according to claim 1, wherein a welding contour having a thickness of the pipe wall in the flattened section surrounds the adapter.

5. A gauge according to claim 1, wherein the flattened section is disposed inside a diameter of the pipe when the pipe is viewed in cross section in a direction of an axis of the pipe.

6. A gauge according to claim 1, wherein the adapter and the pipe section are welded to each other by a rotating TIG welding process and a wall thickness of the pipe section is between 0.8 and 6.0 mm.

7. A gauge according to claim 1, wherein the adapter is manufactured as a turned or milled part and a cross-section of the adapter is symmetrically formed in at least one axis.

8. A gauge according to claim 1, wherein the adapter has a hollow guard pipe section which reaches a center axis of the pipe section.

9. A gauge according to claim 8, comprising a temperature probe mounted in a guard pipe of the adapter.

10. A gauge according to claim 1, wherein the adapter has a front-flush membrane and comprises a means for measuring pressure.

11. A gauge according to claim 1, wherein the adapter comprises a circular membrane adapted to transmit a pressure of the a medium to be measured to a pressure sensor via a transmission medium contacting the membrane on a side of the membrane opposite an interior of the pipe section.

12. Process for fixing a gauge on a pipe section, the gauge having an adapter, comprising:
    flattening at least part of a pipe section,
    providing an opening through a pipe wall of the flattened pipe section,
    inserting into the opening an adapter of sufficient size to at least substantially close the opening in the flattened pipe section, and
    welding the adapter in the opening to the flattened pipe section.

\* \* \* \* \*